(12) United States Patent
Alba

(10) Patent No.: US 12,013,234 B1
(45) Date of Patent: Jun. 18, 2024

(54) MEANS FOR PROVIDING HANDS-FREE OPERATION OF A RETRACTABLE, TAPE MEASURE

(71) Applicant: Cristian Alba, Baltimore, MD (US)

(72) Inventor: Cristian Alba, Baltimore, MD (US)

( * ) Notice: Subject to any disclaimer, the term of this patent is extended or adjusted under 35 U.S.C. 154(b) by 0 days.

(21) Appl. No.: 18/590,286

(22) Filed: Feb. 28, 2024

(51) Int. Cl.
*G01B 3/1071* (2020.01)
*G01B 3/1041* (2020.01)

(52) U.S. Cl.
CPC ......... *G01B 3/1071* (2013.01); *G01B 3/1041* (2013.01); *G01B 2003/1074* (2013.01)

(58) Field of Classification Search
CPC ................ G01B 3/1071; G01B 3/1041; G01B 2003/1074
See application file for complete search history.

(56) References Cited

U.S. PATENT DOCUMENTS

| | | | | |
|---|---|---|---|---|
| 550,827 | A * | 12/1895 | Harris et al. ............. | A41H 1/02 33/8 |
| 2,853,785 | A * | 9/1958 | Raifsnider ........... | G01B 3/1071 33/760 |
| 4,542,589 | A * | 9/1985 | Yamamoto ........... | G01B 3/1084 33/18.1 |
| 4,924,597 | A * | 5/1990 | Tursi .................... | G01B 5/0002 33/758 |
| 5,134,784 | A | 8/1992 | Atienza | |
| 5,388,337 | A * | 2/1995 | Powers, II ............... | G01C 9/28 33/352 |
| 5,873,174 | A * | 2/1999 | Kraft ..................... | G01B 3/1071 33/770 |
| 6,082,019 | A * | 7/2000 | Lapp, Jr. ................. | E04F 21/00 33/760 |
| 6,173,505 | B1 * | 1/2001 | Munno ................ | G01B 3/1071 33/760 |
| 6,338,204 | B1 | 1/2002 | Howle | |
| 8,091,250 | B1 * | 1/2012 | Jinks .................... | G01B 3/1056 33/758 |
| 8,407,909 | B2 | 4/2013 | Lindsay | |
| 11,415,401 | B2 | 8/2022 | Beckwith et al. | |
| 11,719,538 | B2 * | 8/2023 | Tecu .................... | A63C 19/065 33/293 |
| 11,752,798 | B2 * | 9/2023 | Lin ......................... | B43L 13/00 33/332 |

(Continued)

FOREIGN PATENT DOCUMENTS

KR  100848188 B1 * 7/2008

*Primary Examiner* — Yaritza Guadalupe-McCall
(74) *Attorney, Agent, or Firm* — Larry J. Guffey, Esq.; Oliver & Grimsley, LLC

(57) ABSTRACT

A means that enables a retractable tape measure, of the type having a housing, to be used hands-free for measuring across the top of a body includes: (a) a base, (b) a plurality of rods, each with distal and a proximal ends, with each of the rods' proximal ends attached to the base's upper portion in a manner that extends them perpendicularly from this base, (c) a plurality of openings in the bottom surface of the housing, with each of these opening is configured to allow the rods' distal ends to pass through these opening, (d) a drive mechanism, located in this housing, that is configured to cause the rods' proximal ends to temporarily move the base either away from or towards the housing's bottom surface, and (e) a portion of this drive mechanism configured to control its operation.

20 Claims, 4 Drawing Sheets

(56) References Cited

U.S. PATENT DOCUMENTS

| | | |
|---|---|---|
| 11,821,727 B2 | 11/2023 | Khangar et al. |
| 2009/0229136 A1* | 9/2009 | Howard .................. G01C 9/26 33/301 |

* cited by examiner

– 1 –

MEANS FOR PROVIDING HANDS-FREE OPERATION OF A RETRACTABLE, TAPE MEASURE

BACKGROUND OF THE INVENTION

1. Field of the Invention

The present invention generally relates to geometrical instruments for measuring distance. More particularly, this invention relates to an improved retractable, tape measure.

2. Description of the Related Art

Retractable tape measures have been popular for many years and have often been the subject of patent grants. For example, see U.S. Pat. Nos. 5,134,784, 6,338,204, 8,407,909, 11,415,401 and 11,821,727.

In general, a retractable tape measure includes some widely recognized features, including: a metal (or other material having similar strength properties [e.g., fiberglass, plastic] which allow thin strips of them to be extended from one end without excessive bending downward under gravity; herein after "metal") tape that is retractably mounted within a housing, a retraction means (e.g., a coiled metal spring with a free end that connects to the metal tape's proximal end and around which this metal tape is itself coiled) for retracting the tape through a housing opening, an end stop for preventing the free end of the tape from retracting into the housing, and a lock which releasably secures the tape in an extended position. Additionally, other shared features of these standard retractable tapes include: (i) lateral cross-section curvature across the width of the tape that is created by having the tape's lateral sides turned upward, this is to provide stiffness to the tape so that it's free end can extended to a maximum distance from its housing without bending downward, the (ii) the tapes extend from their housings at a point on the side of the front side of the housings which is proximate the housing's bottom surfaces, and (iii) measurement indicia are only on the top surface of the tape.

Despite their many years of wide-spread use, such standard, retractable, tape measures are not always easy to use. For example, carpenters and others often encounter significant problems in using a retractable, tape measure when they are trying to make measurements on the flat, top portion of a body (e.g., a board), but also need to have their hands free for other tasks, see FIG. 1 (see also FIG. 2 which shows a view of the front surface of this housing and its opening through which the free end of the measure's retractable, metal tape is extended to make a measurement).

The situation creates the problem that there is nowhere, during the desired measurement, to sit the housing's bottom surface after the retractable tape's end stop has been attached to the distal edge of the to-be-measured body and the measure's metal tape has been extended horizontally across the body and past its proximal edge. This orientation is necessary in order to place a portion of the tape's indicia, for measurement purposes, directly above the proximal edge of the body being measured. However, this orientation also places the measure's housing, not above a body's top portion on which it might then sit, but just outside and lateral to the proximal edge of the body's top portion.

Thus, despite this prior art, one finds that standard, tape measures are not always as user friendly as they might be. The need exists for an improved, retractable tape measure that is easier to use in the situation described above. An object of the present invention is to provide an improved, retractable tape measure that is more user friendly than existing retractable, tape measures.

DESCRIPTION OF THE PREFERRED EMBODIMENT

Figure 1:
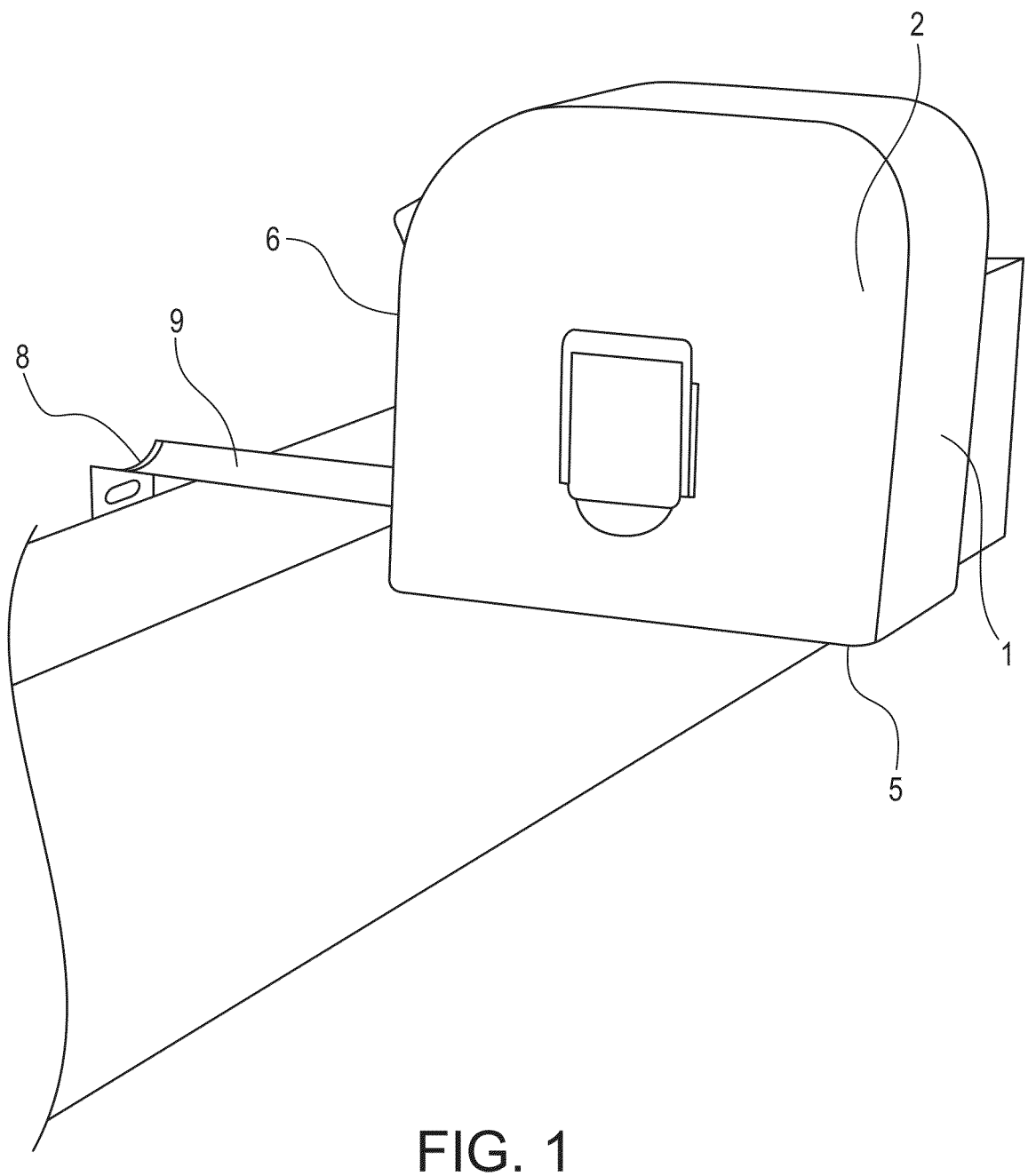
FIG. 1 is a perspective view of a retractable, tape measure which illustrates the problem that arises when one is trying to measure the width of the flat, top portion of a board, but also needs to have one's hands free for another task during such a measurement.
Figure 2:
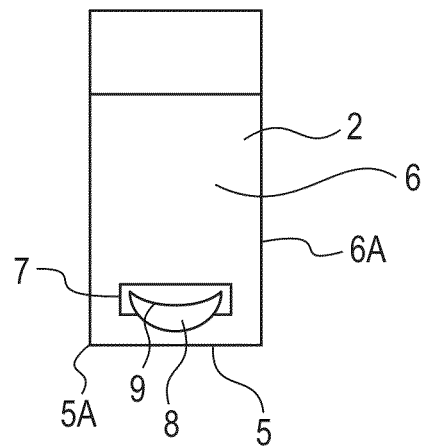
FIG. 2 is a view of the front surface of the housing of the retractable, tape measure shown in FIG. 1.

Recognizing the need for a more user friendly, retractable, tape measure, the present invention seeks to provide such a retractable, tape measure.

Various aspects, advantages and alternative and preferred embodiments may be included in the following description of the present invention. All patents, patent applications, published articles and documents and other things referenced herein are hereby incorporated by this reference in their entirety and for all purposes. To the extent of any inconsistency or conflict in the definition or use of terms between any of the incorporated publications, documents or things and the present application, those of the present application shall prevail.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 3:
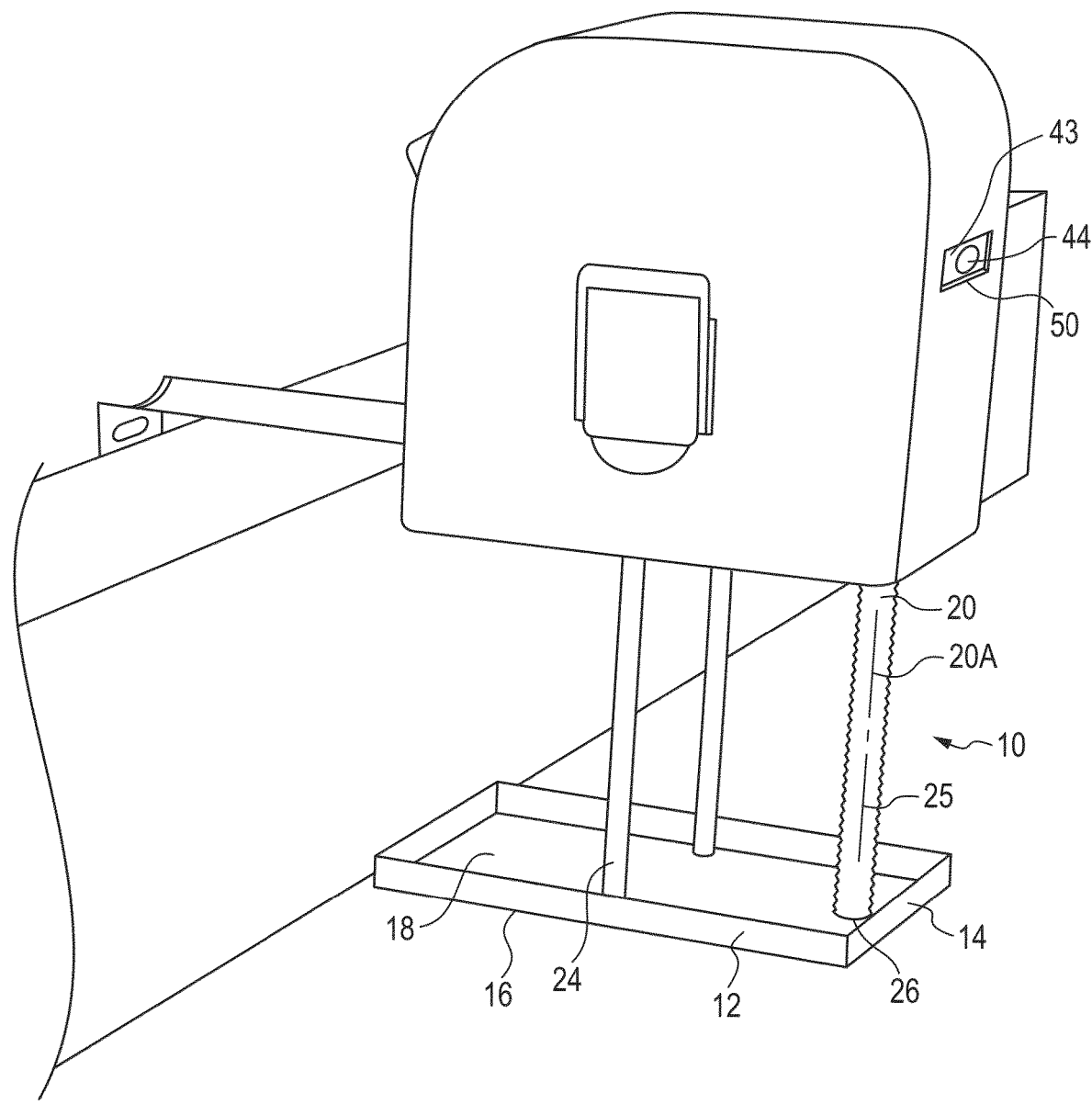
FIG. 3 is a perspective view of a preferred embodiment of the present invention when it is being used to make the problematic measurement illustrated in FIG. 1.

FIG. 3 shows a perspective view of a preferred embodiment of the present invention 10 when it is being used to make the problematic measurement illustrated in FIG. 1. The retractable tape measure 1 shown has a housing 2 with an enclosed interior volume 3 that is bounded by the housing's interior surface 4. This housing further includes a flat bottom surface 5, and a front surface 6 which has, at a specified distance $\Delta x$ above the level of the housing's bottom surface, an opening 7 through which the distal or free end 8 of the measure's retractable, metal tape 9 is extended to make a measurement.

In a preferred embodiment, the present invention 10 is seen to be a retractable means that extends from the housing's bottom surface 5 and provides a retractable base 12 that is temporarily set at an adjustable distance from the measure's bottom surface 5 in order to locate the housing's front surface opening 7 at a desired height. This height is chosen so as to allow the measure's metal tape 9 to be extended, without being bent, to make a measurement (generally in a horizontal plane). Meanwhile, the present invention's retractable base 12 holds the measure so that one using the measure does not have to use their hands for this task.

The present invention's base has an exterior surface 14 that includes a flat, bottom portion 16 and an upper portion 18. This flat bottom portion is appropriately sized and configured so as to provide a stable base for holding the measure's housing when it is elevated above the surface on which this base 12 is sitting.

A plurality of straight rods 20, each having a distal 22 and a proximal 24 end and an axial centerline 25 extending therebetween, and a specified length, are seen to extend from the base's upper portion 18. Each of these rods' proximal ends are each attached to this upper portion at a contact point 26 and these are arranged at locations and in a specified pattern on the base's upper portion so as to stably support the weight of the above measure 1.

In general, these contact points will be as close as possible and proximate the edges 15 of the base's upper portion 18. The reason for this is explained below.

Figure 4:
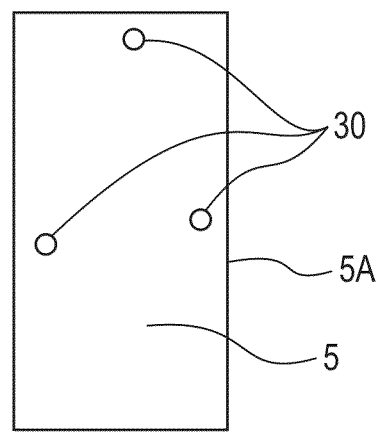
FIG. 4 is a view of the bottom surface of the housing of the preferred embodiment of the present invention shown in FIG. 3.

The present invention also includes providing a plurality of openings 30 in the housing's bottom surface 5. See FIG. 4. These openings are arranged in the same specified pattern of the upper portion's contact points 26, consequently each of these openings 30 is proximate an edge 5A of the bottom surface 5. Each of these openings is configured to allow the distal end of a rod 20 to pass perpendicularly through such an opening 30 and into the housing's interior volume 3.

Figure 5:
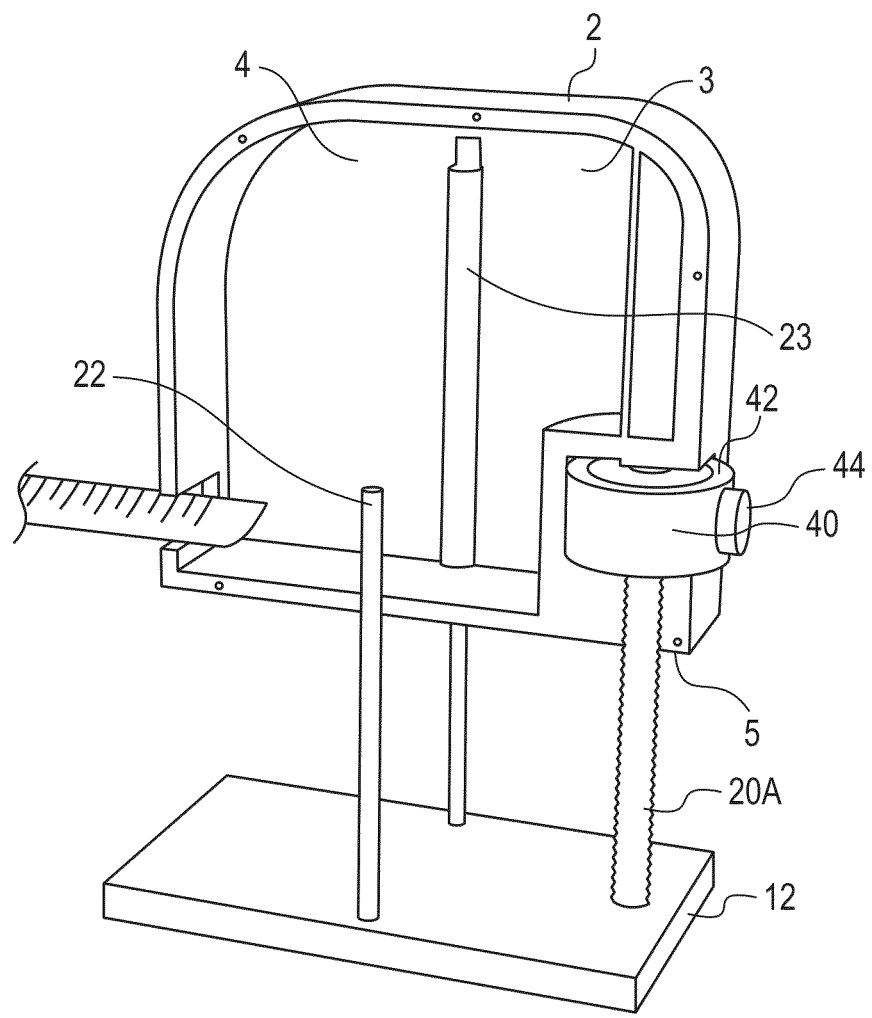
FIG. 5 is a partial, cut-away view of the side surface of the preferred embodiment of present invention shown in FIG. 3 and reveals a portion of this housing's enclosed interior volume and its interior surface, etc.

Since these openings are near the edges of the bottom surface, each of the rods' centerlines 25 are seen to be aligned, inside the housing's interior volume, parallel to and proximate the interior portion of a housing side surface 6A. See FIG. 5 which shows a cross-sectional view of the side surface 6A of the preferred embodiment of the present invention, and after the measure's metal tape and its retraction means have been removed from the housing's interior volume 3, in order to better show the interior portions of the housing's side surfaces (or the housing's interior surface 4). These side surfaces are seen to have a plurality of anchoring means or anchors 23 (e.g., a tube which attaches to a side surface or side wall and encloses at least a portion of one of the rods) that are configured to help ensure that each of the rods' axial centerlines 25 continues to move parallel to the housing's sidewalls as the rods' distal ends 22 are retracted back into the housing's interior volume.

The distal ends 22 of at least one of these rods (i.e., the threaded, drive rod 20A) is joined to a drive mechanism 40 (e.g., a threaded nut whose rotation causes the threaded rod to move up or down) that is contained within the housing's interior volume and attached to its interior surface 4. This drive mechanism is configured to provide the means needed to temporarily and retractably move at least this drive rod 20A up and down to extend the base 12, with the help of the other rods, to a desired separation distance from the housing's bottom surface 5. This drive mechanism has an exterior surface 42 that includes a control portion 43 which is configured to be used by one who wants to control the up and down movement of the drive mechanism and consequently the location of the retractable base 12 with respect to that of the bottom surface 5 of the measure's housing.

This drive mechanism may also be configured in the form of or to have a quick-release nut that is designed to make base separation distance adjustments faster and easier by reducing the number of revolutions required to position the nut to a specific location on the threaded rod. This quick-release nut has a button or knob 44, which, when pushed or activated, releases the nut from the rod's thread to allow the base to be manually located up or down on the rod to provide a desired separation distance and then locked into place. Adjustments requiring more precision can be made by reattaching the nut to the rod's threads and rotating the nut.

An operational opening 50 is provided in the housing to allow said control portion 43 of the drive mechanism's exterior surface to protrude through this opening and into the environment surrounding the housing and thereby make it accessible to one who wants to use the present invention and extend its base 12 away from the tape measure's bottom surface 5.

In another preferred embodiment, the present invention 10 is seen to be a method of providing "hands-free" operation of a retractable, tape measure. The steps in this method include: (a) providing a base having a flat, bottom portion and an upper portion, (b) providing a plurality of rods, each having a distal and a proximal end, wherein each of the rods' proximal ends are attached to the upper portion at a contact point and in a manner so as to allow each of the rods to extend perpendicularly from this upper portion, and wherein these contact points are arranged in a specified pattern, (c) providing a plurality of openings in the housing's bottom surface, wherein these openings are arranged in the same specified pattern of the contact points, and wherein each of these opening is configured to allow a rod's distal end to pass through the opening and into the housing's enclosed volume, (d)

locating a drive mechanism in the housing's enclosed volume and configuring it to contact each of the rods and cause their proximal ends to temporarily move the base's upper portion either away from or towards the housing's bottom surface, (e)

locating an operational switch in the housing's enclosed volume and attaching it to the drive mechanism and configuring it to control the drive mechanism's operation, and (f) locating an operational opening in this housing, and providing the operational switch with a contact point that is configured to pass through the operational opening so as to allow one in the environment surrounding the housing to operate this switch to control the operation of the drive mechanism.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is set forth in the herein claims to the invention.

I claim:

1. A means that enables a retractable tape measure, having a housing with an enclosed volume and a bottom surface, to measure across the top of a body whose bottom is resting on an underlying surface, and on which also rests, by utilizing said means, said retractable tape measure so as to thereby leave the hands of one making said measurement free for other tasks, said means comprising:

a base having a flat, bottom portion and an upper portion,
a plurality of rods, including one of which is a drive rod, and each of said plurality of rods having a distal and a proximal end,
wherein each of said rods' proximal ends are attached to said upper portion at a contact point and in a manner so as to allow each of said rods to extend perpendicularly from said upper portion, wherein said contact points are arranged in a specified pattern, a plurality of openings in said housing bottom surface, wherein said openings are arranged in said specified pattern of said contact points, wherein each of said opening is configured to allow said distal ends of said plurality of rods to pass through said opening and into said housing enclosed volume, a drive mechanism having an exterior surface that includes a control portion and located in said housing enclosed volume and configured to contact said drive rod and cause said proximal end of said drive rod to temporarily move said base in a direction chosen from the group including away from and towards said housing bottom surface, and wherein said control portion is configured to be used by one to control the up and down movement of said drive mechanism.

2. The means as recited in claim 1, further comprising:

an operational opening in said housing configured to allow said control portion of said drive mechanism's exterior surface to protrude through said operational opening and into the environment surrounding said housing.

3. The means as recited in claim 2, wherein:

said contact points are located proximate the edges of said base upper portion.

4. The means as recited in claim 3, wherein:

each of said plurality of rods having an axial centerline, said housing having an interior surface that includes a side surface, an anchor attached to said side surface and configured to ensure that said axial centerline of said rod moves parallel to and proximate said housing side surface.

5. The means as recited in claim 4, wherein:

said drive mechanism having a quick-release nut.

6. The means as recited in claim 2, wherein:

each of said plurality of rods having an axial centerline, said housing having an interior surface that includes a side surface, an anchor attached to said side surface and configured to ensure that said axial centerline of said rod moves parallel to and proximate said housing side surface.

7. The means as recited in claim 1, wherein:

said contact points are located proximate the edges of said base upper portion.

8. The means as recited in claim 7, wherein:

each of said plurality of rods having an axial centerline, said housing having an interior surface that includes a side surface, an anchor attached to said side surface and configured to ensure that said axial centerline of said rod moves parallel to and proximate said housing side surface.

9. The means as recited in claim 1, wherein:

each of said plurality of rods having an axial centerline, said housing having an interior surface that includes a side surface, an anchor attached to said side surface and configured to ensure that said axial centerline of said rod moves parallel to and proximate said housing side surface.

10. The means as recited in claim 1, wherein:

said drive mechanism having a quick-release nut.

11. A method that enables a retractable tape measure, having a housing with an enclosed volume and a bottom surface, to measure across the top of a body whose bottom is resting on an underlying surface, and on which also rests, by utilizing said means, said retractable tape measure so as to thereby leave the hands of one making said measurement free for other tasks, said method comprising the steps of:

providing a base having a flat, bottom portion and an upper portion, providing a plurality of rods, including one of which is a drive rod, and each of said plurality of rods having a distal and a proximal end, wherein each of said rods' proximal ends are attached to said upper portion at a contact point and in a manner so as to allow each of said rods to extend perpendicularly from said upper portion, wherein said contact points are arranged in a specified pattern, providing a plurality of openings in said housing bottom surface, wherein said openings are arranged in said specified pattern of said contact points, wherein each of said opening is configured to allow said distal ends of said plurality of rods to pass through said opening and into said housing enclosed volume, providing a drive mechanism having an exterior surface that includes a control portion and located in said housing enclosed volume and configured to contact said drive rod and cause said proximal end of said drive rod to temporarily move said base in a direction chosen from the group including away from and towards said housing bottom surface, and wherein said control portion is configured to be used by one to control the up and down movement of said drive mechanism.

12. The method as recited in claim 11, further comprising the step of:

providing an operational opening in said housing configured to allow said control portion of said drive mechanism's exterior surface to protrude through said operational opening and into the environment surrounding said housing.

13. The method as recited in claim 12, wherein:

said contact points are located proximate the edges of said base upper portion.

14. The method as recited in claim 13, wherein:

each of said plurality of rods having an axial centerline, said housing having an interior surface that includes a side surface, an anchor attached to said side surface and configured to ensure that said axial centerline of said rod moves parallel to and proximate said housing side surface.

15. The method as recited in claim 14, wherein:

said drive mechanism having a quick-release nut.

16. The method as recited in claim 12, wherein:

each of said plurality of rods having an axial centerline, said housing having an interior surface that includes a side surface, an anchor attached to said side surface and configured to ensure that said axial centerline of said rod moves parallel to and proximate said housing side surface.

17. The method as recited in claim 11, wherein:

said contact points are located proximate the edges of said base upper portion.

18. The method as recited in claim 17, wherein:

each of said plurality of rods having an axial centerline, said housing having an interior surface that includes a side surface, an anchor attached to said side surface and configured to ensure that said axial centerline of said rod moves parallel to and proximate said housing side surface.

19. The method as recited in claim 11, wherein:
each of said plurality of rods having an axial centerline,
said housing having an interior surface that includes a side surface,
an anchor attached to said side surface and configured to ensure that said axial centerline of said rod moves parallel to and proximate said housing side surface.

20. The method as recited in claim 11, wherein:
said drive mechanism having a quick-release nut.

\* \* \* \* \*